United States Patent [19]
Stone

[11] 3,825,108
[45] July 23, 1974

[54] CONVEYOR ASSEMBLY WITH CONVERTIBLE EXTRUSIONS

[75] Inventor: Guthrie B. Stone, Honeoye, N.Y.

[73] Assignee: Stone Conveyor, Inc., Honeoye, N.Y.

[22] Filed: Sept. 5, 1972

[21] Appl. No.: 286,211

[52] U.S. Cl.................. 198/204, 198/189, 198/195
[51] Int. Cl............................................. B65g 15/60
[58] Field of Search ............. 198/28, 189, 204, 102, 198/195

[56] References Cited
UNITED STATES PATENTS

| | | | |
|---|---|---|---|
| 2,369,557 | 2/1945 | Gettelman | 198/189 X |
| 3,669,244 | 6/1972 | Pagdin | 198/204 X |
| 3,669,247 | 6/1972 | Pulver | 198/189 |

FOREIGN PATENTS OR APPLICATIONS

| | | | |
|---|---|---|---|
| 217,712 | 7/1958 | Australia | 198/189 |

Primary Examiner—Richard A. Schacher
Assistant Examiner—Richard K. Thomson
Attorney, Agent, or Firm—Harvey B. Jacobson; Clarence A. O'Brien

[57] ABSTRACT

A conveyor assembly comprising a pair of elongated convertible side frame sections of extruded aluminum, or the like, each of said frame members including a vertical side wall with first and second elongated support flanges at the top and bottom edges thereof, respectively, said flanges being of different horizontal dimensions to accommodate different size standard conveyor chains. The frame members are selectively oriented during installation to provide the desired flanges at the top to support a conveyor chain of corresponding dimensions with the pivot joints of the chain disposed between the opposite top flanges.

9 Claims, 7 Drawing Figures

CONVEYOR ASSEMBLY WITH CONVERTIBLE EXTRUSIONS

In the past, various conveyor assemblies have been provided for handling bottles and other containers which are susceptible to easy tipping during movement. Many bottle handling processes require shifting between several conveyor lanes to effect speed changes, changes in direction, and the like. This shifting has been achieved in various manners, for the most part, entailing modifications to existing conveyor assemblies or the use of specialized additional equipment to effect the transfer. While most such conventional constructions have operated satisfactorily, they were costly to manufacture and install, often requiring special designs to meet each particular application.

Therefore, it is an object of the present invention to provide a novel conveyor assembly side frame members which may be oriented in abutting relationship to each other to allow easy transfer of containers or the like between adjacent conveyors.

Another object of the present invention is to provide a unique conveyor assembly including a pair of side frame members of relatively inexpensive extruded aluminum construction, or the like, which may be assembled in alternate orientations depending upon the width of conveyor chain being utilized.

It is a further object of the present invention to provide a versatile conveyor assembly including a pair of oppositely disposed side frame members each including a pair of different size flanges, the frame members being convertible, such that they may be oriented to provide the appropriate size flange in supporting engagement with a standard conveyor chain of corresponding size.

Still another object of the present invention is to provide a novel side frame member formed from extruded aluminum, or the like, of a configuration allowing side-by-side mounting of a plurality of conveyor assemblies, whereby the conveyor chain of each assembly is immediately adjacent that of the adjacent assembly to effect easy transfer of materials therebetween.

These together with other objects and advantages which will become subsequently apparent reside in the details of construction and operation as more fully hereinafter described and claimed, reference being had to the accompanying drawings forming a part hereof, wherein like numerals refer to like parts throughout.

Figure 1:
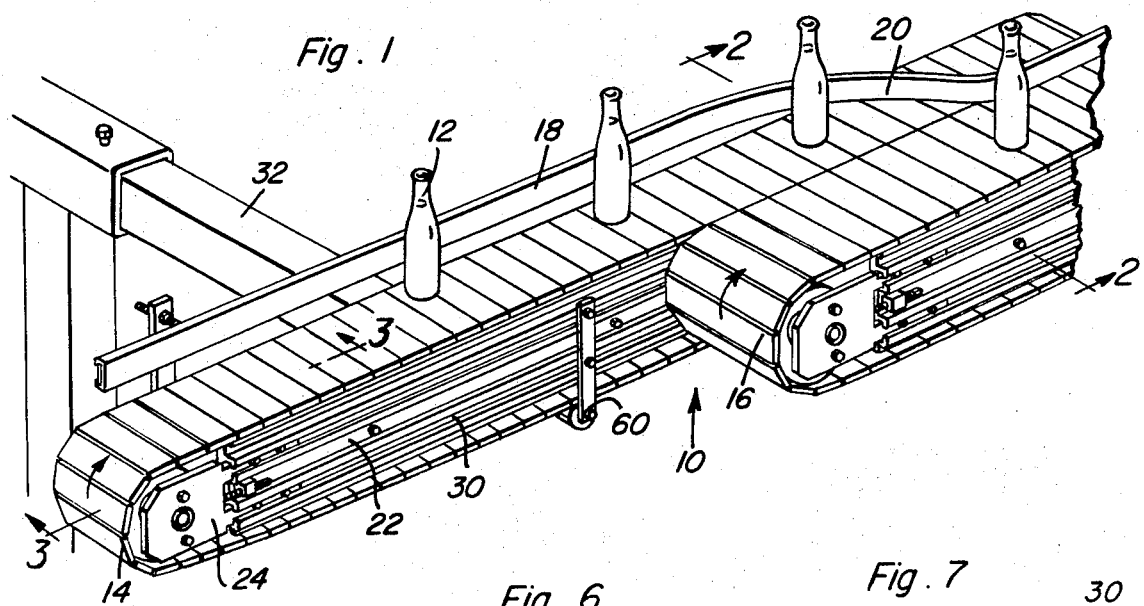
FIG. 1 is a perspective view of a typical pair of conveyor assemblies of the present invention mounted in side-by-side relationship to effect transfer of bottles therebetween.

Referring now, more particularly, to FIG. 1 of the drawings, a pair of the conveyor assemblies of the present invention are generally indicated by the numeral 10 and are arranged in a typical manner for the handling of bottles as indicated at 12. The conveyor assemblies include endless conveyor chains 14 and 16 which are advanced in the same directions as indicated by the arrows at the end of each conveyor. An elongated guide rail 18 extends parallel to conveyor chain 14 and is curved gently, as indicated at 20, to effect transverse movement of the bottles onto conveyor chain 16. Of course, it will be appreciated that the assemblies shown in FIG. 1 merely illustrate a typical application. The conveyor assemblies may be mounted in various arrangements with a greater number of lanes than illustrated in FIG. 1, depending upon the particular application.

It should be noted that the edges of the adjacent conveyor chains move extremely close to each other, such that the gap therebetween is negligible and will not adversely affect the balance of the containers as they are transferred between chains. This is achieved by the configuration of the extruded side frame members 22 which extend along the length of each conveyor assembly. In addition, the drive rollers of the assemblies are supported by bearings carried by flush-type mounting plates as indicated at 24. Each mounting plate is adjustably fastened to the end of the associated extrusion and is positioned such that it does not extend outwardly beyond the edges of the associated conveyor chain. This permits adjacent conveyor assemblies to be mounted flush with each other, as hereinafter explained.

Figure 2:
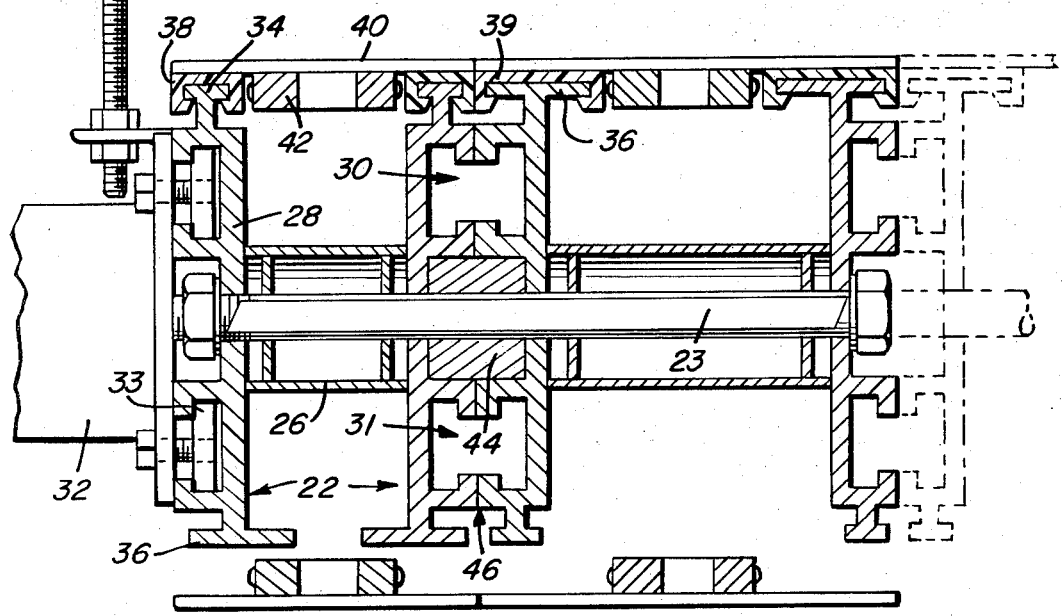
FIG. 2 is a sectional view taken along section 2—2 of FIG. 1.
Figure 3:
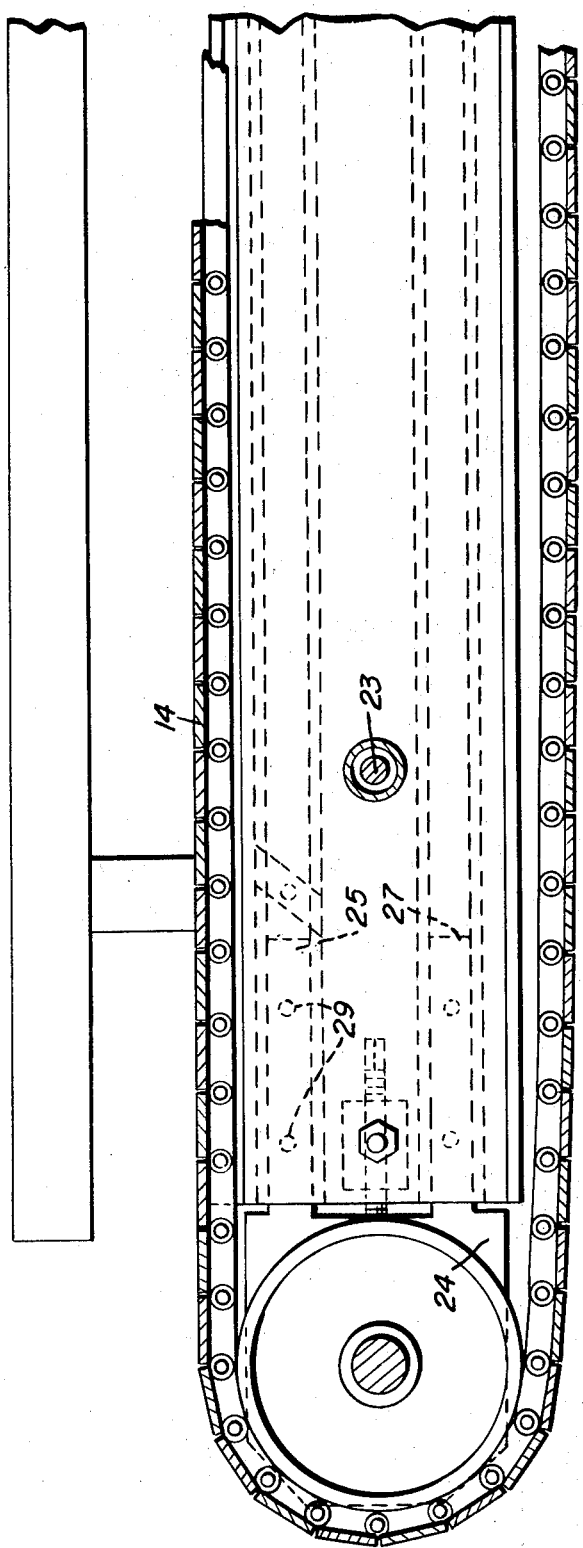
FIG. 3 is a sectional view taken along section 3—3 of FIG. 2.

With reference to FIGS. 2 and 3, it will be observed that each conveyor assembly includes a pair of spaced parallel side frame members 22, preferably fastened together by way of transversely extending bolts 23 which pass through apertures in the sides of the frame members. Each pair of frame members is spaced apart a predetermined distance by way of a tubular spacer 26, preferably of cylindrical configuration. Each frame member includes a vertical wall 28, one side of which is engaged by the tubular spacer, the opposite side being provided with a pair of elongated mounting channels or T-slots 30 and 31. Each mounting channel is adapted to accommodate threaded fasteners 33 of appropriate configuration, as hereinafter explained, for supporting various pieces of equipment, such as guide rail 18, normally associated with the conveyor operations. If desired, the mounting channels may be used for fastening the conveyor assembly to a major support beam or structure, such as that indicated at 32.

Figure 5:
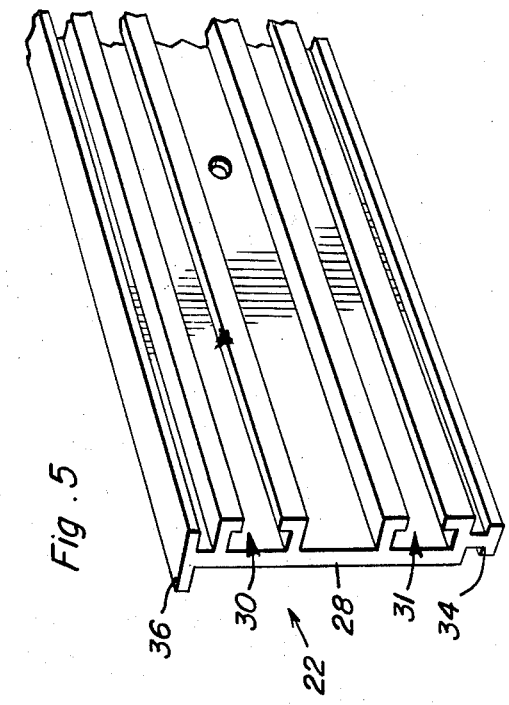
FIG. 5 is a partial perspective view of a side frame member associated with the present invention.

Referring to FIGS. 2, 3 and 5, it will be observed that each of the frame members is provided with a pair of support flanges 34 and 36 integral with vertical side wall 28 along the top and bottom edges thereof. Each flange extends along substantially the entire length of the frame member and is provided with a generally flat, horizontal surface adapted to support the overlying conveyor chain. Flange 34 is of lesser horizontal dimension than flange 36, and the frame members are symmetrical to the extent that they may be mounted with either flange at the top. This permits a single frame member to be utilized for conveyor assemblies with different width conveyor chains.

As mentioned above, it is essential that the chains of adjacent conveyors are maintained close together to permit transfer of the materials between conveyors without having to straddle a noticeable gap. Large support flanges 36 are utilized for supporting standard chains of larger lateral dimension, such as 4½ inch, 6 inch, or 7 inch size. When utilizing narrower conveyor chain, such as the standard 3¼ inch chain, support flanges 36 would be too wide to permit transfer without a significant gap between conveyors.

Referring again to FIG. 2, it will be observed that each flange supporting the conveyor chain is provided with a wear strip 38 or 39 of appropriate width which fit over the support flange and extend along substantially the entire length of the frame. Each wear strip is made of a low friction, long-lasting material such as high molecular weight polyethylene. Each conveyor chain is comprised of a plurality of material handling members 40 pivotally connected together by joints 42. The frame members are appropriately spaced apart such that the pivotal joints are disposed between the opposite support flanges. The material handling members extend outwardly from the pivotal joints and slidably move over the associated wear strips. Since conveyor chain of greater width are provided with greater overhang beyond the pivotal joints, it is desirable to utilize larger support flanges, or in other words flanges 36, with appropriately sized wear strips 39.

When providing lateral transfer between adjacent conveyor assemblies, the frame members of each assembly are mounted in abutting engagement, as shown in FIG. 2, to provide a minimum gap between the adjacent conveyor chains. A spacer key 44 may be mounted between the frame members, and, if desired, shims (not shown) may be inserted at 46 to assure that the adjacent moving chains do not come into rubbing engagement with each other. Both support flanges 34 and 36 extend outwardly the same distance on the T-slot side of the frame member, while flange 36 extends inwardly on the opposite side a greater distance than does flange 34. Thus, while flange 36 provides a greater support area, its offset relative to the vertical wall permits flush mounting with the frame member of the adjacent conveyor when the wear strips are inserted. It should be noted, that if desired, the wear strips may be eliminated and the support flanges increased in lateral dimension by a corresponding amount.

Figure 6:
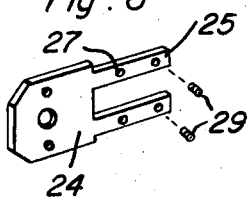
FIG. 6 is a perspective view of a flush-type bearing support plate associated with the present invention.
Figure 7:
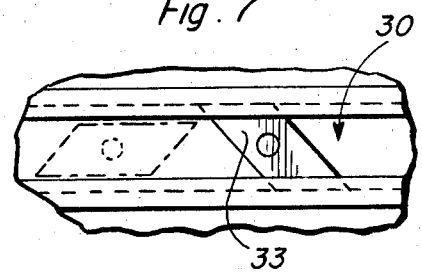
FIG. 7 is a partial elevational view of a side frame member with a mounting nut fastened thereto.

With reference to FIGS. 3 and 6, it will be observed that mounting plate 24 is of relatively thin, flat configuration with a pair of spaced fingers 25 and 27 which are received by T-slots 30 and 31 of the frame members. Each of the fingers is provided with a pair of threaded apertures 27 which receive set screws 29. Since mounting plate 24 supports the bearings inboard, and since the fingers are received by the frame member T-slots, the bearing and mounting do not extend beyond the horizontal extent of the associated conveyor chain and does not interfere with flush mounting between the adjacent conveyors.

Figure 4:
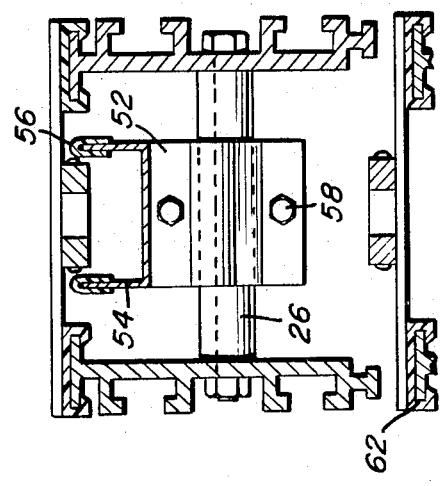
FIG. 4 is a cross-sectional view of a second embodiment of the conveyor assembly of the present invention.

With particular reference to FIG. 4, it will be appreciated that when utilizing conveyor chains of standard widths greater than 4½ inches, it may be desirable to provide center guides 52 each with a pair of upwardly extending arms 54 with wear strips 56 mounted thereon. The wear strips embrace the pivotal joints of the conveyor chain to prevent lateral slippage of the chain during movement along the support flanges. Preferably, a guide member is mounted at each spacer 26 and is connected thereto by suitable means, such as bolts indicated at 58.

Return of the conveyor chain may be accommodated in several manners, depending upon the weight and length of the conveyor chain. For applications utilizing relatively short lengths of chain, it may not be necessary to provide return support. When handling longer chains, return rollers, such as that indicated at 60 in FIG. 1, or return wear strips such as those indicated at 62 in FIG. 4 may be utilized.

From the foregoing description, it will be appreciated that the conveyor assembly of the present invention provides a versatile means of mounting a plurality of conveyor assemblies adjacent to each other to permit lateral transfer of materials therebetween without significant gaps which might topple materials such as containers. The use of the elongated extruded frame members provides a conveyor assembly which is economical to manufacture and install. Since both the right and left frame members are identical to each other the cost of manufacture are kept to a minimum. Installation in the field may be made at a minimum cost with standard pieces of frame member being cut to the required lengths. Furthermore, the convertibility of the frame members allows a single size of frame member to be utilized in installations with conveyor chains covering a wide range of sizes.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. For use with a chain conveyor assembly, an elongated side frame member comprising a vertical side wall, a first flange integral with the top of said side wall, and a second flange integral with the bottom of said side wall, said flanges each defining horizontal surfaces adapted to support a conveyor chain, the horizontal surface of one of said flanges being of greater width than the horizontal surface of the other of said flanges to support different size conveyor chains, said frame member being selectively convertible to orient such with either of said flanges at the top, said frame member including first and second spaced parallel mounting channels along substantially the entire length of one side of said vertical side wall.

2. The structure set forth in claim 1, wherein said first and second flanges extend horizontally outward the same distance on said one side, one of said flanges extending horizontally outward a greater distance than the other on said opposite side of said vertical wall.

3. The assembly set forth in claim 1 wherein said channels are vertically spaced identically relative to the adjacent horizontal surfaces, an additional conveyor assembly similar to said first-mentioned conveyor assembly and including third and fourth side frame members, said third frame member abutting said second frame member.

4. The assembly set forth in claim 3, wherein the edges of the respective chains of said conveyor assemblies are immediately adjacent to each other to allow a transfer of materials therebetween.

5. The assembly set forth in claim 4, together with means for fastening the frame members of each conveyor assembly together and spacing such at predetermined distances apart corresponding to the chain sizes of each conveyor assembly.

6. The assembly set forth in claim 5, herein each of said flange structures supporting a conveyor chain includes a low-friction wear strip in sliding engagement with the associated chain, the wear strips associated with said second and third flange structures abutting each other along their outer edges.

7. A convertible conveyor assembly comprising first and second elongated, spaced parallel frame members with upper support flange structures spaced a predetermined distance apart, and a movable conveyor chain comprising a plurality of links defining material handling members, said links being connected together by pivotal joints disposed between said opposite flange structures, said material handling members including outer edge portions resting on said flange structures and extending laterally outward from said joints and terminating along the outer edges of the respective flange structures, each of said frame members including a vertical side wall structure integral with said upper flange structure, and a lower flange structure integral with the bottom of said side wall, said upper and lower flange structures being of different horizontal dimensions to accommodate different width conveyor chains, said frame members being selectively convertible to reverse the positions of said upper and lower flange structures, the vertical side walls of said frame members having inner sides confronting each other and outer sides, said upper and lower flange structures being relatively horizontal and extending outwardly approximately to the extend of said outer sides, one pair of said flange structures extending inwardly toward said inner side farther than the other pair of said flange structures to define a support flange of relatively greater lateral dimension to accommodate wider conveyor chains.

8. The assembly set forth in claim 7, wherein each of said flange structures supporting said conveyor chain includes a low-friction wear strip in sliding engagement with the chain.

9. For use with a chain conveyor assembly, an elongated side frame member comprising a vertical side wall, a first flange integral with the top of said side wall, and a second flange integral with the bottom of said side wall, said flanges each defining horizontal surfaces adapted to support a conveyor chain, the horizontal surface of one of said flanges being of greater width than the horizontal surface of the other of said flanges to support different size conveyor chains, said frame member including lengthwise oriented mounting means having portions thereof spaced longitudinally along said frame member which are identically spaced from said horizontal surfaces, whereby in either of two 180° angularly displaced positions of said frame member rotated about a transverse axis extending through a mid-portion of said frame member, the uppermost horizontal surface of said frame member will be disposed in a predetermined position relative to an associated support structure for said frame member to which said spaced portions of said mounting means are secured.

* * * * *